April 15, 1952    R. H. DICKE    2,593,120
WAVE GUIDE TRANSMISSION SYSTEM
Filed March 8, 1945    2 SHEETS—SHEET 1
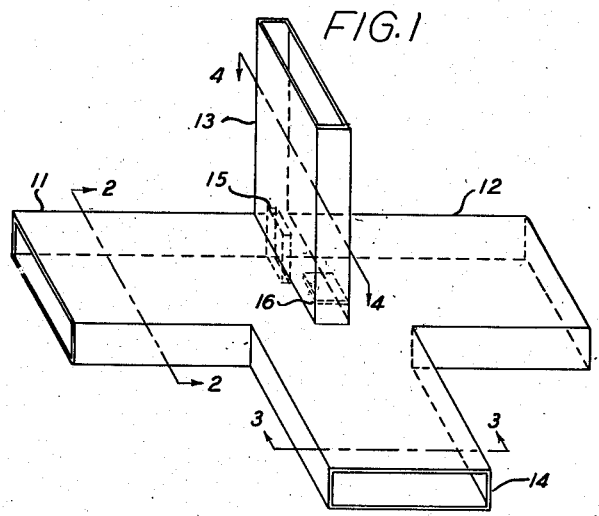
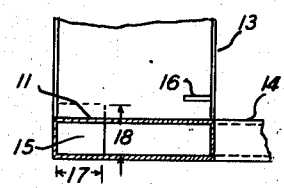
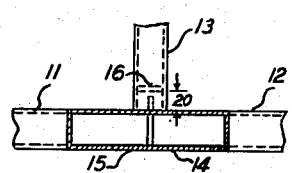
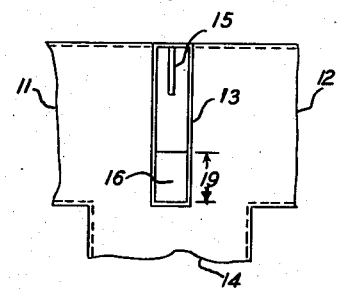
FIG.5
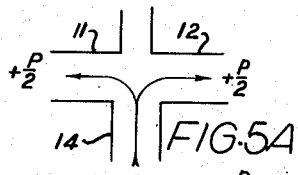
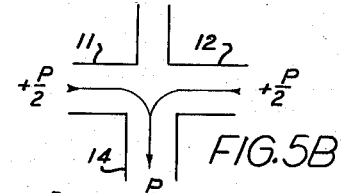
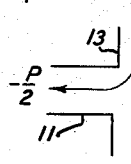
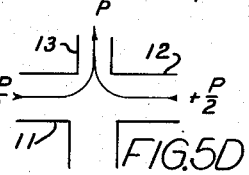
INVENTOR.
ROBERT H. DICKE
BY
*William D. Hall*
ATTORNEY INVENTOR.
ROBERT H. DICKE
BY
*William D. Hall*
ATTORNEY Patented Apr. 15, 1952

2,593,120

UNITED STATES PATENT OFFICE 2,593,120

WAVE GUIDE TRANSMISSION SYSTEM

Robert H. Dicke, Cambridge, Mass., assignor, by mesne assignments, to the United States of America as represented by the Secretary of War Application March 8, 1945, Serial No. 581,695

3 Claims. (Cl. 178—44)

This invention relates to transmission systems and more particularly to transmission systems for use with ultra high frequency energy.

According to conventional theory the dominant mode of operation of a wave guide may be defined as that condition of operation in which the configuration of electric and magnetic lines of force permits the transmission of energy at the lowest possible frequency through a wave guide of a given size and geometric cross-section. It may also be defined with equal accuracy as that condition of operation in which the configuration of electric and magnetic lines of force permits the transmission of energy through the smallest dimensional wave guide of a given cross-section at a given frequency.

In a rectangular wave guide operated in the dominant mode, there exists a sinusoidal distribution of electric lines of force along the major axis of the rectangular cross-section. These electric lines of force or electric field vectors are perpendicular to the major axis of the rectangle.

When a main rectangular wave guide designed to be operated in the dominant mode is joined symmetrically by a wave guide whose axis is parallel to the electric field vectors in the main wave guide, the juncture is said to be a series junction. When the joining wave guide is symmetrical to a main wave guide and the axis of the joining guide is perpendicular to the electric field vectors within the main guide, the junction is said to be a parallel junction. When these two junctures, one series and one parallel, are made in such a manner that the axes of the series and parallel wave guides join the axis of the main wave guide at the same point certain unique properties exist. Broadly, any geometric arrangement of four wave guide branches will also give these unique properties if the following conditions are met. The axes of the four guides must meet at a common point. In a first and second of these guide branches the electric lines of force are perpendicular to each other and the lines of force in one of these first and second wave guide branches must be perpendicular to a plane passing through the axes of the first and second wave guide branches. The third and fourth of these wave guide branches must be symmetrical with respect to the plane passing through the axes of the first and second wave guide branches which was just referred to. These unique properties are explained further in the detailed discussion of the drawings. It will be appreciated, however, by those skilled in the art that where any abrupt change in structure occurs, mismatch and consequent undesirable reflections also tend to occur. This is especially so where one wave guide branches into two or more wave guides. When a wave guide is terminated in its characteristic impedance, no mismatch or reflections will occur. The desirability of the unique properties referred to above render it advisable to eliminate the unwanted mismatch and reflections.

In certain radio communication systems a common radiating and receiving device, or antenna, is used for transmitting and receiving and in such systems a part of the channel for transmitted energy is common to a part of the channel for the received energy. There then exists the problem of preventing the transmitted energy, which is of normally higher level, from being partly spent in the receiver channel and damaging the receiving device. Conversely, there exists the problem of preventing the received energy of normally lower level from being wasted in the transmitter channel. In certain cases it is absolutely essential that the transmitted power be eliminated or at least minimized, from the receiver. A system of transmit-receive or T-R devices were made to achieve this purpose. However, there still existed at least two sources of trouble. The first was that an initial high level transmitted energy spike managed to escape the action of the T-R device and the second was that the T-R device was not capable of excluding from the receiving device a low level or plateau of energy.

Many methods have been employed in the past for matching or transforming one impedance to another. At the lower radio frequencies this is done with lumped circuits such as transformers or with line stubs such as the double stub tuner. For radio frequencies sufficiently high to warrant the use of wave guides these stub tuners can still be used but with increasing difficulty. Impedance transformers with greater range of matching and ease of operation are desirable.

Oftentimes in radio work it is desired to variably attenuate or reduce a signal in magnitude. At low radio frequencies the problem is simple, but at frequencies for which wave guides are practical the problem of a variable attenuator becomes quite complex.

One object of this invention is, therefore, to terminate each wave guide at its junction with other wave guides in its characteristic impedance.

A further object of this invention is to provide a system for permitting energy to flow to and from a common element through a common channel with no coupling between the sending and the receiving elements which are located at the same end of the common channel.

Still another object of this invention is to match or transform one impedance into another.

A still further object of this invention is to provide a variable attenuator, capable of handling large amounts of power, using matched wave guide junctions.

In accordance with the present invention there is provided a matched junction formed by three wave guides. One of the three wave guides is joined to a second of the three wave guides in a series junction. The third wave guide joins the second wave guide in a parallel junction. An iris, for matching purposes, is inserted in the second wave guide. It is mounted in such a position as to lie in a plane which also contains the axes of the first and third wave guides. A second iris is located within the first wave guide. The two irises are so adapted that each wave guide sees as its termination at the junction its characteristic impedance.

For a better and fuller understanding of the invention, together with other objects thereof, reference is made to the following detailed description taken in connection with the accompanying drawings in which:

Fig. 1 shows an improved wave guide junction;

Figs. 2, 3, and 4 show views looking into different wave guides making up the junction of Fig. 1 to show the position of matching irises;

Figs. 5A, 5B, 5C, and 5D facilitates describing some of the unique properties of the matched junction shown in Fig. 1;

Figure 6:
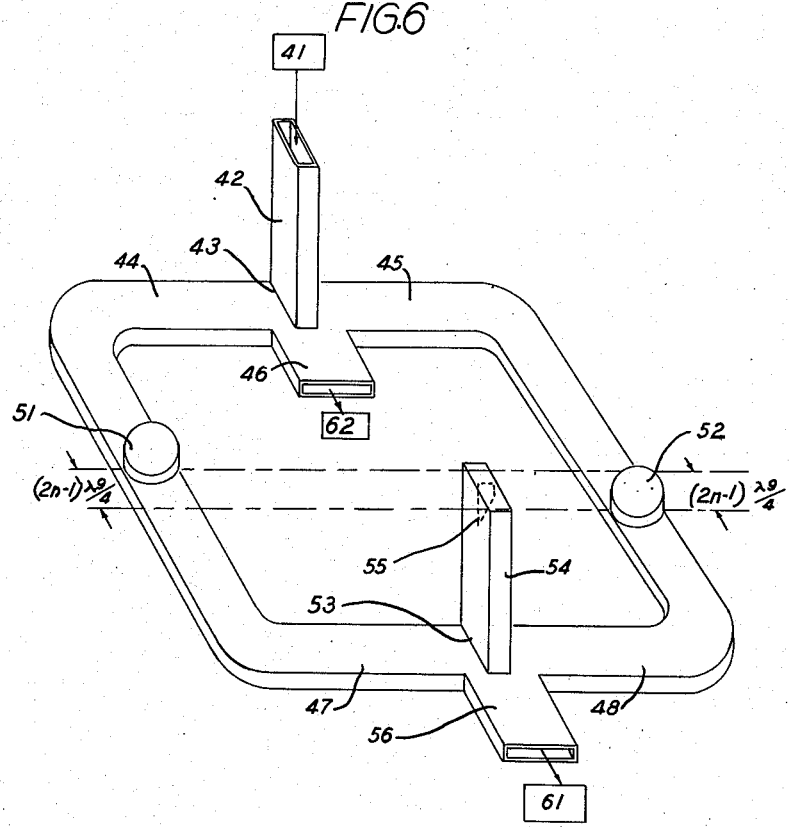
Fig. 6 shows an improved transmission system.

Referring now more particularly to Fig. 1, there is shown a matched junction formed by three wave guides. A first wave guide with two branches 11 and 12 is joined by a second wave guide 13, symmetrically in a series connection. A third wave guide 14 is joined symmetrically and in a parallel connection to the first wave guide 11—12. The series and parallel junctions are so made that the axes of the first, second, and third wave guides meet in a common point. Fig. 1 shows the wave guides 13 and 14 as being perpendicular to the wave guide 11—12. While this is a preferred embodiment, it is not desired to limit the invention here described to this geometric arrangement. Two irises 15 and 16, preferably in the form of thin plates of conducting material, are inserted at the junction to permit matching of all four wave guide branches, that is to say, looking from any one of the four wave guide branches toward the junction each of the wave guide branches will be terminated by its characteristic impedance. Fig. 2 shows the iris 15 partially closing off wave guide branch 11 as it is viewed from line 2—2 in Fig. 1. In Fig. 3 this same iris 15 is shown as it is viewed from line 3—3 in Fig. 1. Fig. 4 again shows the iris 15 as it is viewed from line 4—4 in Fig. 1. Figs. 2, 3, and 4 taken together show the iris 15 to be within the wave guide 11—12 and to lie in a plane which includes the axes of wave guides 13 and 14. By variations of the length 17 and the depth 18 of the iris 15 shown in Fig. 2, the iris 15 is adjusted empirically so that the third branch 14 is terminated in its characteristic impedance. Fig. 4 also shows the position of the iris 16. Figs. 2 and 4 taken together show the iris 16 to be within the wave guide 13. By variation of the length 19 of the iris 16 (Fig. 4) and the axial distance 20 of the iris 16 from the junction (Fig. 3), the iris 16 is adjusted empirically so that the second branch 13 is terminated in its characteristic impedance.

Referring now to Figs. 5A, 5B, 5C, and 5D specifically, there is shown four novel ways in which the matched junction of Fig. 1 operates. Although there are other novel modes in which a junction, such as is illustrated in Fig. 1, operates, the modes illustrated in Figs. 5A-5D inclusive are deemed sufficient for explanatory purposes. In Fig. 5A energy P, which enters the parallel connected wave guide 14, divides at the junction into the two branches 11 and 12 of main wave guide. The energy divides equally, and the two parts are in phase with each other as indicated by the designation $+(P/2)$ at the ends of each of wave guide branches 11 and 12. In Fig. 5B the converse of the condition illustrated in Fig. 5A is shown. If energies of equal magnitude and similar phase $+(P/2)$ enter the two branches 11 and 12 of the main wave guide, these energies combine at the junction, and all of this energy enters the parallel connected wave guide 14 and is designated by P. In Fig. 5C is shown the condition where energy P enters the series connected wave guide 13. This energy divides equally and passes into the two branches 11 and 12 of the main guide. The two energies will be in 180° phase opposition as shown by the designation $-(P/2)$ at the end of guide branch 11 and the designation $+(P/2)$ at the end of guide branch 12 in this figure. Fig. 5D shows the converse of the condition shown in Fig. 5C. If energies of equal magnitude and in 180° phase opposition as indicated by $-(P/2)$ and $+(P/2)$, the energies will combine and will all enter the series connected wave guide 13. This energy is designated by P. To those skilled in the art, it will be obvious that energies which enter the two branches of the main guide but which are neither in phase nor in phase opposition will be combined and will divide going into both the series and the parallel connected wave guides. The relative division into the series and parallel connected wave guides will be a function of the phase relation existing between the two energies. This will be readily seen when one considers that either energy may be resolved into two components, one component in phase and one component in phase opposition to the other energy.

In Fig. 6 there is shown a novel apparatus employing the matched junction of Fig. 1 in a wave guide circuit. This is the preferred arrangement. However, the circuit will function if unmatched junctions are used. A transmitter or transmitting device 41 is connected to a wave guide 42. Wave guide 42 comprises the series connected branch of a first matched junction 43. The parallel connected wave guide 46 of this junction 43 is connected to a radiating device 62. The branches 44 and 45 of the junction 43 are connected, respectively, to the branches 47 and 48 of a second matched junction 53. The electrical length of wave guide 44—47 from the junction 43 to the junction 53 differs from the electrical length of wave guide 45—48 from the junction 43 to the junction 53 by an integral number of wave lengths. "Integral number"

is taken to include zero. The series connected wave guide 54 of the second matched junction 53 is terminated in an absorptive load 55. The parallel connected wave guide 56 of the second matched junction 53 goes to a receiving device 61. Two T-R devices 51 and 52 are inserted in the two wave guides 44—47 and 45—48. Their electrical distances from the junction 43 differ by an odd number of quarter wave-lengths. A transmit-receive (T-R) device may be defined for the purposes of this invention as a device operative only by high level energy and which when operative will cause a maximum of reflection of the high level energy to occur. Low level energy such as received signals will not operate the T-R device and so will continue past the device unaltered.

A detailed description of the operation of the apparatus of Fig. 6 follows. The transmitter 41 is connected to feed energy into the apparatus through wave guide 42. Referring to Fig. 5C, we note that this energy will divide at the matched junction 43 equally, going into wave guide 44 and wave guide 45 in 180° phase opposition with no energy passing directly into wave guide 46. The energy of high level transmission will break down the T-R devices 51 and 52, but both relatively short high level energy and relatively long low length energy which escapes the action of the T-R devices continue past the T-R devices 51 and 52 with no phase change and reach the matched junction 53. The path from junction 43 through wave guide 44—47 to junction 53 being equal in electrical length to the path from junction 43 through wave guide 45—48 to junction 53, and since the energy in these two paths leaves junction 43 in 180° phase opposition, the energy in these two paths arrives at the matched junction 53 in 180° phase opposition. Referring to Fig. 5D, we note that this energy will all pass into wave guide 54 and be absorbed by the matched load 55. It is to be noted that no energy from either the relatively short high level portion or the relatively long low level portion passes into the wave guide 56 and receiving device 61. The energy which does not pass the T-R devices 51 and 52 is reflected back toward the matched junction 43. However, when energy travels from junction 43 through wave guide 45 to T-R device 52 and back to junction 43, it travels an odd number of half wavelengths farther than energy that travels from the junction 43 through wave guide 44 to T-R device 51 and back to junction 43. The two energies which are reflected from the T-R devices 51 and 52 arrive at junction 43 in phase. This is true because the two energies leave junction 43 in 180° phase opposition, and then the energy in wave guide 45 experiences an extra delay of an odd number of half wavelengths, and, therefore, the two energies are again in phase. Referring to Fig. 5B, it is noted that this reflected energy will pass into wave guide 46 and thence to radiating device 62. Energy which enters junction 43 from the radiating device 62 by means of guide 46 divides equally and with no phase difference between the guides 44 and 45. None of this energy enters wave guide 42. Normally the energy from the radiating device 62 is not sufficient in quantity to operate the T-R devices 51 and 52, and thus it will all continue on to the junction 53. The energies arrive at junction 53 in phase, since they start from junction 43 in phase and travel equal electrical distances.

At junction 53 this energy passes on into wave guide 56 and thence to receiving device 61.

It will be obvious to those skilled in the art that the functions performed by the parallel and series connected branches 46 and 42 and 56 and 54 may be interchanged if the interchange is made at both junctions 43 and 53. The functions of the wave guide branches 46 and 42 and 56 and 54 may also be interchanged at either junction 43 or 53 by properly adjusting the relative lengths of the wave guides 44—47 and 45—48.

Figure 7:
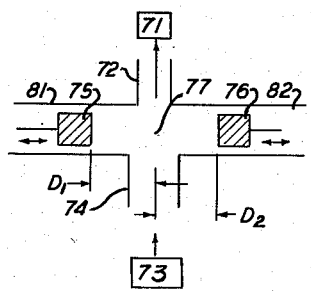
Fig. 7 shows an improved impedance transformer.

Fig. 7 shows a device employing a matched junction in a wave guide circuit as an impedance transformer. Because of the desirability of the matched junction, it is preferred for use in this circuit. However, the circuit will function with junctions like the one shown in Fig. 1 if the matching irises are omitted. The impedance 71 to be transformed is connected to a series connected wave guide 72 of a junction 77. The impedance 73 to which impedance 71 is to be transformed is seen when looking into a parallel connected wave guide 74. Two plungers 75 and 76 are inserted in wave guides 81 and 82 and are adapted to be adjusted in their relative positions. These two plungers are located at distances $D_1$ and $D_2$, respectively, from the junction as shown in Fig. 7.

The method for determining the distances $D_1$ and $D_2$ is explained in the following part of the specification.

In a wave guide such as wave guide 72 which is terminated by an impedance 71, which is equal to $Z_1$, other than its characteristics impedance $Z_c$ there exists standing waves and associated therewith a standing wave ratio SWR. The SWR is defined as the ratio of the maximum amplitude of signal along the wave guide to the minimum amplitude of signal along the wave guides. The maximum and minimum amplitudes normally exist one fourth wavelength apart. If the impedance 71 or $Z_1$ is divided by $Z_c$, the resulting quotient which is a complex notation locates a point on an impedance circle diagram known as the Smith chart. A circle passing through this point with $1+j0$ as the center will describe the loci of all impedances existing along wave guide 72. Since we normally desire a matched system, we wish to transform $Z_1$ to $Z_c$. By variation of $D_1$ and $D_2$ it is possible to match any impedance $Z_1$ to the wave guide 72 i. e. to transform it to $Z_c$. $D_1$ and $D_2$, the distances from the center of the T-junction to the plungers 75 and 76, can be thought of as being determined by two parameters X and Y which are functions of the two impedances $Z_1$ and $Z_c$ considered. The following relation holds:

(1)
$$D_1 = X + Y$$

(2)
$$D_2 = X - Y$$

It is normally possible to calculate or determine experimentally the SWR. If the terminating impedance $Z_1$ and the characteristic impedance $Z_c$ are known and both are pure resistances, then the reflection coefficient A is given by (3)
$$A = \frac{Z_1 - Z_c}{Z_1 + Z_c}$$

and if the SWR is determined experimentally, the reflection coefficient A is given by (4)
$$A = \frac{SWR - 1}{SWR + 1}$$

The following expression derived from a consideration of the junction described above gives a relationship between the reflection coefficient A and D₁ and D₂.

(5) $$A = \tfrac{1}{2}\left(1 + \cos\frac{4\pi(D_1 - D_2)}{\lambda}\right)$$

However, since from Equations 1 and 2

(6) $$D_1 - D_2 = 2Y$$

Equation 5 may be solved for Y. From any arbitrary value of X, Y may be set by a system of levers arranged to move the two plungers 75 and 76 equally in opposite directions from the center of the junction 77 or Y may be set for each plunger separately. This will set up the proper SWR in the wave guide containing the impedance $Z_1$. If now we vary X, we can effectively move the standing waves until the actual impedance $Z_1$ agrees with the value of the standing wave existing at the termination. Varying the parameter X can be thought of as rotating the Smith diagram or as effectively lengthening the wave guide between the point of matching and the terminating impedance $Z_1$. A system of levers may be set up which will move the two plungers 75 and 76 in the same direction from the center of the junction and hence automatically set both plungers to conform to X.

It can be shown that any electrically symmetrical impedance transformer which will match any impedance to a wave guide will also match any impedance to any other impedance. As shown in the case above, if both plungers 75 and 76 are changed in position by the parameter Y, the SWR only is changed and the movement on the Smith chart is radial. If, however, we move only one plunger, the movement on the Smith chart will be circular. If we move the other plunger, we move along another circular path. It is possible, therefore, by altering the two plungers individually to transform any impedance to any other.

Figure 8:
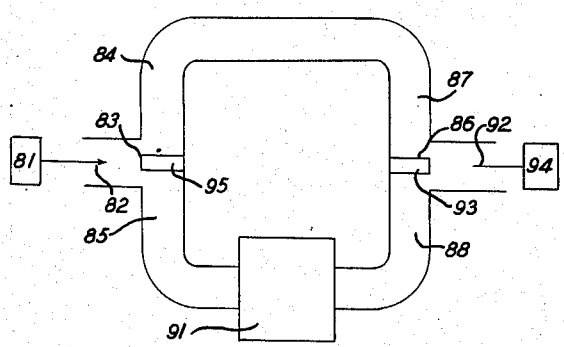
Fig. 8 shows an improved variable attenuator system.

Referring now particularly to Fig. 8, there is shown a novel wide range variable attenuator designed for use in the ultra high frequency range and employing the matched junctions shown in Fig. 1. These matched junctions are preferred for use in this attenuator circuit. However, the circuit will function with junctions in which the matching irises are omitted. A power source 81 is connected to a parallel connected wave guide 82 of a first matched junction 83. A series connected wave guide 95 is terminated in an absorptive load, not shown, preferably a matched sand load. The branches 84 and 85 of the first junction 83 are connected, respectively, to branches 87 and 88 of a second matched junction 86. A variable line stretcher 91 is adapted to be a part of the energy path through guide branches 85—88. A variable line stretcher may be described as a section of line or wave guide whose electrical length is variable. A series connected wave guide 93 of the second junction 86 is terminated in an absorptive load, not shown, preferably a matched sand load. A parallel connected wave guide 92 of the junction 86 is connected to an active load 94.

In the operation of the apparatus shown in Fig. 8, energy from power source 81 enters wave guide 82. At the junction 83 the energy divides into wave guides 84 and 85 equally. Energy in wave guide 84—87 continues on to junction 86 where it is combined with energy which travels by means of the wave guide 85—88. The energy in wave guide 85—88, however, passes through the variable line stretcher 91 so that when it reaches the junction 86, its phase with respect to the energy arriving through wave guide 84—87 may differ anywhere from 0° to 360°. The division of energy between wave guide 92 and wave guide 93 depends upon the relative phases of the two energies arriving at the junction 93. It is evident, therefore, that the amount of energy going into either wave guide 92 or 93 can be controlled by adjusting the relative phases of the two energies arriving at the junction 86 by means of the line stretcher 91. The power source 81 and the sand load terminating guide 95 may be interchanged without affecting the operation of the attenuator. It is also to be understood that the line stretcher 91 may be located in either wave guide 84—87 or wave guide 85—89 or it may be located in both wave guides 84—87 and 85—89. Further it is understood that power source 81 and active load 94 may be interchanged if desired without departing from the true intent of this invention.

While there has been described what is at present considered the preferred embodiments of the invention, it will be obvious to those skilled in the art that various changes and modifications may be made thereon without departing from the invention, and it is, therefore, aimed in the appended claims to cover all such changes and modifications as fall within the true spirit and scope of the invention.

I claim:

1. An electrical apparatus comprising a first wave guide junction having first, second, third and fourth branches, first and second branches forming a main wave guide, said third branch being series connected to said first and second branches, said fourth branch being parallel connected to said first and second branches, said first, second, third, and fourth branches being so joined that their axes meet in a common point; a first iris inserted in said main wave guide in a plane containing the axes of said third and fourth branches; a second iris inserted in said third branch, said first and second irises being adapted to cause each of said first, second, third and fourth branches to be terminated at the junction in its own characteristic impedance; a transmitting means connected to one of said third and fourth branches; a radiating device connected to the remaining of said third and fourth branches; a second wave guide junction having fifth, sixth, seventh and eighth branches corresponding respectively to said first, second, third and fourth branches of said first junction; third and fourth irises positioned in said second junction to correspond in function and position respectively to said first and second irises; an absorber load connected to one of said seventh and eighth branches; a receiving device connected to the remaining of said seventh and eighth branches; means for connecting said first and second branches to said fifth and sixth branches for providing two paths between said first and second junction, the relative lengths of said two paths being such that energy from said radiating device that passes through said connecting means arrives at said second junction in proper phase relationship to pass on into said receiving device; and means within the two paths of said connecting means for causing a maximum of reflection to occur when energy of an amplitude greater than a predetermined value impinges thereon, said reflecting means in the two paths differing in electrical distance from said first junction by an odd number of quarter wavelengths.

2. An electrical apparatus comprising a first wave guide junction having first, second, third and fourth branches, said first, second, third, and fourth branches being so joined that their axes meet in a point, said first and second branches being symmetrical with respect to a plane which is perpendicular to the electric lines of force in one of said third and fourth branches and which passes through the axes of said third and fourth branches, said third and fourth branches being so disposed that the electric lines of force therein are mutually perpendicular, a transmitting means connected to one of said third or fourth branches; a radiating device connected to the remaining of said third or fourth branches; a second wave guide junction having fifth, sixth, seventh and eighth branches corresponding respectively to said first, second, third and fourth branches of said first junction; an absorber load connected to one of said seventh or eighth branches; a receiving device connected to the remaining of said seventh or eighth branches; means for connecting said first and second branches to said fifth and sixth branches for providing two paths between said first and second junctions, the relative lengths of said two paths being such that energy from said radiating device that passes through said connecting means arrives at said second junction in proper phase relationship to pass on into said receiving device; and means within the two paths of said connecting means for causing a maximum of reflection to occur when energy of an amplitude greater than a predetermined value impinges thereon, said reflecting means in the two paths differing in electrical distance from said first junction by an odd number of quarter wavelengths.

3. An electrical apparatus comprising a first wave guide junction including first and second and third and fourth branches, said first and second branches forming a main wave guide, said third branch being series connected to said first and second branches, said fourth branch being parallel connected to said first and second branches, a transmitting means connected to one of said third and fourth branches, a radiating device connected to the remaining of said third and fourth branches, a second wave guide junction having fifth and sixth and seventh and eighth branches corresponding respectively to said first and second and third and fourth branches of said first wave guide junction, an absorber load connected to one of said seventh and eighth branches, a receiving device connected to the remaining of said seventh and eighth branches and means for connecting said first and second branches to said fifth and sixth branches for providing two paths between said first and second junctions, the relative lengths of said two paths being such that energy from said radiating device that passes through said connecting means arrives at said second junction in proper phase relationship to pass on into said receiving device.

ROBERT H. DICKE.

REFERENCES CITED

The following references are of record in the file of this patent:

UNITED STATES PATENTS

| Number | Name | Date |
|---|---|---|
| 2,445,895 | Tyrrell | July 27, 1948 |
| 2,531,419 | Fox | Nov. 28, 1950 |
| 2,531,447 | Lewis | Nov. 28, 1950 |